(12) United States Patent
Armbruster et al.

(10) Patent No.: US 6,243,760 B1
(45) Date of Patent: Jun. 5, 2001

(54) INFORMATION DISSEMINATION SYSTEM WITH CENTRAL AND DISTRIBUTED CACHES

(75) Inventors: Brian Armbruster; Peter Wall, both of Ottawa (CA); Jeff Brown, 12074-201-B Street, Maple Ridge, British Columbia (CA), V2X 3K5

(73) Assignees: VISTAR Telecommunications Inc.; Jeff Brown, both of Ottawa (CA)

( * ) Notice: Subject to any disclaimer, the term of this patent is extended or adjusted under 35 U.S.C. 154(b) by 0 days.

(21) Appl. No.: 08/881,113

(22) Filed: Jun. 24, 1997

(51) Int. Cl.[7] ............................. G06F 13/38; G06F 15/17
(52) U.S. Cl. ............................................ 709/243; 709/201
(58) Field of Search ........................... 395/200.3, 200.31, 395/200.48, 200.49, 200.68, 200.73; 711/118, 119, 122; 709/200, 201, 218, 219, 238, 243

(56) References Cited

U.S. PATENT DOCUMENTS

| | | | | |
|---|---|---|---|---|
| 5,594,863 | * | 1/1997 | Stiles | 395/182.13 |
| 5,644,751 | * | 7/1997 | Burnett | 395/440 |
| 5,694,543 | * | 12/1997 | Inoue | 395/200.01 |
| 5,740,370 | * | 4/1998 | Battersby et al. | 395/200.49 |
| 5,793,973 | * | 8/1998 | Birdwell et al. | 395/200.53 |

OTHER PUBLICATIONS

Microsoft Press Computer Dictionary, p. 60, 1994.*

* cited by examiner

Primary Examiner—Mark H. Rinehart
(74) Attorney, Agent, or Firm—Marks & Clerk

(57) ABSTRACT

A system for disseminating information over a wide area network includes a central caching unit for storing data to be made available over the wide area network. Local access give users access to the wide area network. Distributed caching units associated with the local access nodes for store cacheable material. A satellite communications system establishes satellite communications between the central caching unit and the local caching units for the transfer of cacheable material from the central caching unit to the local units. A router at the local access nodes routes packets from users to a destination address. The router includes local routing tables containing the addresses of material cached at the associated local node and responds to routing requests for locally cached material by directing the requests to the local cache.

22 Claims, 2 Drawing Sheets

INFORMATION DISSEMINATION SYSTEM WITH CENTRAL AND DISTRIBUTED CACHES

FIELD OF INVENTION

This invention relates generally to the distribution of large amounts of data over a network, such as the Internet, and more particularly to a satellite based Internet caching system.

In recent years the Internet has become widely used as a means of disseminating information to a large number of people. Users, who may have access to the Internet via an Internet Service Provider (ISP) can access web pages residing on servers that may be located anywhere around the globe. As usage increases, so do the demands on bandwidth, leading to congestion in the network, which results in frustrating delays for the users.

One solution to the problem of ever increasing bandwidth requirements is to bring web content to locations close to users by means of a cache.

All caching systems attempt to move content closer to the client. Two principal types of caching systems, demand and mirrored caching, are currently being deployed throughout the Internet.

In demand caching, clients request web material though a shared intermediary known as a proxy server, usually located at the Internet Service Provider (ISP). If the material is located on the proxy server, the proxy server returns the material to the client. If not, the proxy server retrieves the material from the remote server, returns it to the client and caches it for later access by other clients. The material cached at the proxy server can in turn be accessed by other subscribers so that there is no need for them to access it through the network.

Demand caching is passive to the content provider, users determine what is cached by their access patterns. Demand caching also involves a chain of caches: the client's cache, local to a client's browser, the proxy cache and sometimes intermediate network cache points. As the cache becomes full, stale material is removed on a least use basis or by use of time-to-live parameters.

Demand caching suffers from several problems. As the content provider is a passive participant in the scheme, it is often unaware that its material is being copied and stored—demand caching often violates copyright laws; as cached copies and originals are not synchronized, the copy returned to other users is sometimes not the content provider's most recent copy but the previously cached version; as well, demand caching hierarchies, along with making routing difficult and being complex to maintain and implement, make it difficult for content providers to control access to their sites, to get an accurate picture of how often their pages are being accessed or to provide custom support to local databases.

In mirrored caching the content provider has a more active role. The content provider manages, or selects an agent to manage, a distributed system of mirrored sites. The sites are placed strategically through the network and the content provider or his agent pro-actively maintains synchronization amongst these sites by distributing material over the Internet.

Though providing more control to the web page owner, mirrored caching has its problems. The mirroring of sites is complex to maintain; the system forces end users to explicitly choose one of the mirrored sites; and, lastly, the sites are often remote from an ISP's point of presence; hence clients can still suffer from network delays.

An object of the invention is to alleviate the aforementioned problems in the prior art.

According to the present invention there is provided a system for disseminating information over a wide area network, comprising at least one site for disseminating data to remote users on said network, said at least one site having a network address associated therewith and being accessible over said wide area network, and said data including cacheable and non-cacheable parts; a central caching unit having a network address associated therewith for storing cacheable data from said at least one site; means for establishing communication between said at least one site and said central caching unit for transferring cacheable data to said central caching unit; a plurality of local access nodes for permitting said remote users to access said wide area network; distributed local caching units associated with said local access nodes for locally storing cacheable data; a communications system distinct from said wide area network for establishing communication between said central caching unit and said local caching units for the transfer of cacheable data directly from said central caching unit to said local caching units; and routing means at said local access nodes for responding to user requests for data by establishing a connection to a destination address on said network where the requested data is located, said routing means including local routing tables containing the network address of said central caching unit and responding to connection requests from said remote users to retrieve data located at said central caching unit by first establishing a connection with the local caching unit at the associated local node to retrieve the requested data therefrom if present, and if the requested data is not present at said local caching unit, establishing a connection over said network with said central caching unit to retrieve said requested data over the wide area network.

The communications systems is typically satellite-based, but could also be a terrestrial-based broadcast or multicast system.

The invention is particularly applicable to the Internet, but may also be applied to other wide area networks, such as Intranets.

The system in accordance with the invention allows Internet web content to be stored at the local Internet provider level. The system, referred to as Managed Distributed Caching (MDC), permits the use of differential referencing of web page content, software filters and acknowledged satellite or terrestrial multicast to provide a low cost, easy to manage and copyright transparent, push caching service for the Internet. More specifically, an aspect of the invention relates to a scheme of combining differential referencing and static routing of web page content that provides content providers with a seamless and controllable caching system.

This invention addresses the problems of control, synchrony, complexity and performance that plagued the prior art.

To give complete control to the content provider, system allows the content provider to split web content into cacheable and non-cacheable elements. The splitting is completely under the control of the content provider. The non cacheable elements are stored at the content provider's site or, for small content providers through a virtual hosting mechanism at a central site. The content provider can now control and monitor access to its site and where direct contact with the user is required, provide access to non cached databases (e.g., cgi) and other custom features. Cached items, on the other hand, are transferred to the central cache site.

To ensure that the cached copies are up-to-date and synchronized across a network, the cacheable items, stored at the central cache site, are distributed, by satellite or terrestrial multicast, to caches at the subscribing ISPs.

To ensure that routing between cached and uncached elements is as simple as possible and easy to maintain, proxyless routing, through the use of static routes, is typically used at the ISP router.

The invention also provides a method of disseminating information over a wide area network, comprising the steps of providing at least one site for disseminating data to remote users on said network, said at least one site having a network address associated therewith and being accessible over said wide area network, and said data including cacheable and noncacheable parts; storing cacheable data from said at least one site at a central caching unit having a network address associated therewith; transferring said cacheable material over a communications system distinct from said wide area network directly to distributed local caching units associated with local access nodes giving remote users access to said wide area network for the retrieval of data from sites thereon; and intercepting requests from users at said local access nodes for data residing on said central caching unit and first routing said requests to the local caching unit for retrieval of the requested data therefrom if present, and if the requested data is not present at said local caching unit, subsequently routing said requests to the central caching unit for retrieval of the requested data from the central caching unit.

To ensure that the cached items can be retrieved as quickly as possible, the cache is desirably located at an ISP's point-of-presence.

The invention will now be described in more detail, by way of example only, with reference to the accompanying drawings, in which.

Figure 1:
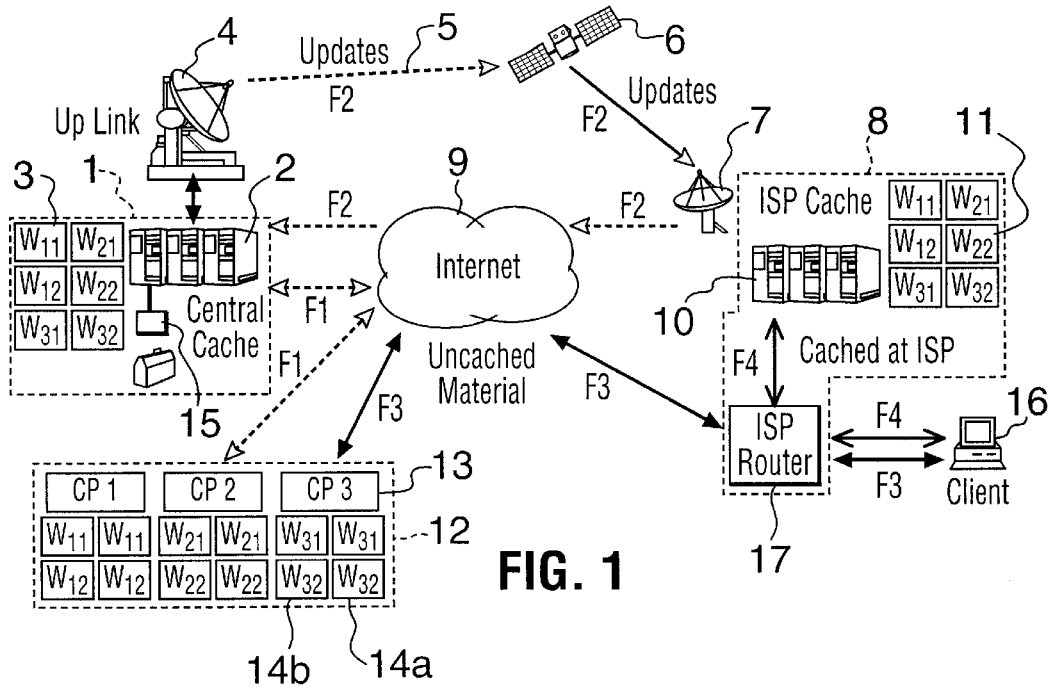
FIG. 1 is a block diagram of a system for disseminating information over a wide area network in accordance with the invention.
Figure 2:
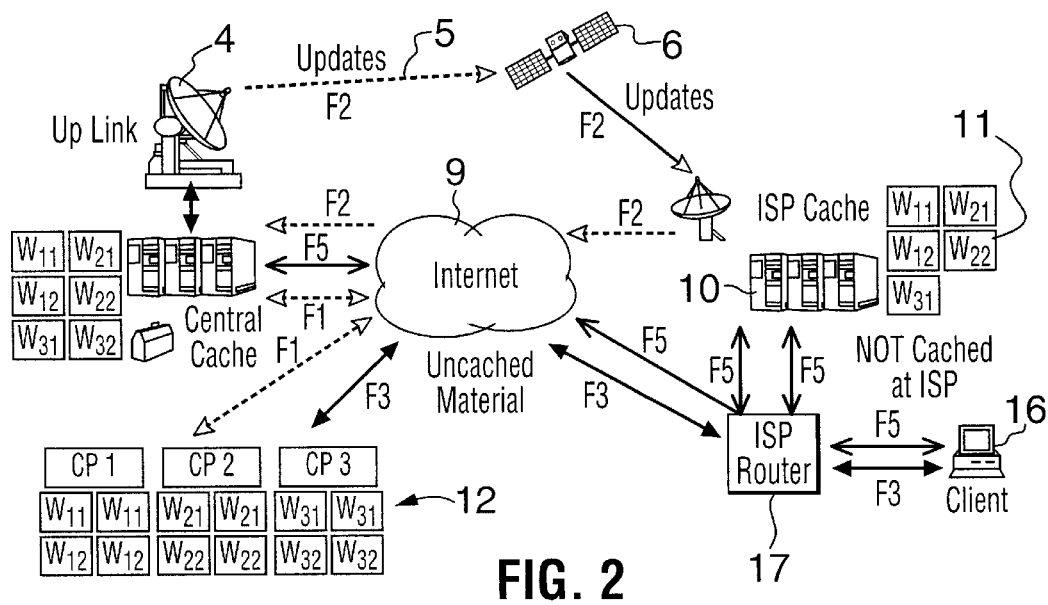
FIG. 2 is a diagram similar to FIG. 1 showing information flow.

The system for disseminating information over a wide area network, typically the Internet, is illustrated in FIGS. 1 and 2. The system comprises a central cache complex or web hosting system 1 consisting of servers 2 and mass storage devices 3 located near a satellite up-link station 4, which provides a cache update channel 5 via a satellite transponder 6 to a receive only receiver 7. The update channel 5 uses commercially available transport software located at the web hosting site 1 and the ISP sites 8. The content is encrypted before transmission.

The receiver is connected to a subscribing ISP (Internet Service Provider) 8 connected to the Internet 9, which provides a return path to the central cache 1. The ISP includes a local caching complex 10, consisting of servers, and mass storage devices 11 for storing cacheable web pages as well as custom filtering software, a web site, and a set of authoring tools and utilities, to be used by content providers for altering and uploading their material.

The main function of the central cache or web hosting system 1 is to store cached pages and handle requests for cached pages that cannot be served by the ISP's local cache.

The ISP caching complex 10 is located near an ISP's point of presence. Its main function is to efficiently store and manage cached material. Software, to enable ISP providers, based on their resource availability or other considerations, to choose the content to be cached, is also commercially available.

A content provider 12, having servers 13 associated with mass storage devices 14a, 14b is connected to the Internet 9 and hence to the central cache complex 1. The storage devices 14a store cacheable material and the storage devices 14b uncacheable material. Cacheable material is generally material of a more permanent nature, rich in graphic content, whereas uncacheable material is generally more transient material, preferably comprising smaller files. Uncacheable material might include information which is continually changing such as stock market quotes, whereas cacheable material might include more static but frequently accessed content such as home pages.

The web site, authoring tools and utilities are used to assist content providers 12 in re-referencing their web pages into cached and uncached elements, uploading these cacheable pages for storage and broadcast, and for performing registration and membership functions.

The central caching complex 1 can be associated with one or a contiguous subset of IP addresses.

A content provider 12, wishing to cache his material with the central complex 1, first registers with the central complex 1 at its web site. Once registered, the content provider will be given access to a set of tools and utilities to enable him to maintain his cached material. The Content Provider will be billed monthly for use based on a published tariff. E-cash and credit card mechanisms are the preferred payment methods. An automated system e-mail receipts and keeps the subscriber informed.

An ISP wishing to become a franchised member will need to contact the marketing group of the facility maintaining the central caching complex.

Once registered, the content provider must determine what files are to be cached. The tools provided will allow both global changes to URLs (e.g freqeuently accessed gif files) and a step-through URL by URL approach. Typically, large inline images, java applets, video and audio clips will be cached.

The URLs (Universal Resource Locators) associated with cacheable items will have the monicker mdc.net inserted after the http://string. For example, a link having the URL http://www.cp1.com/bigpicture.gif will become http://mdc.net/www.cp1.com/bigpicture.gif.

The URL's of non cacheable material e.g., the home page frame, cgi files, e-commerce or personal forms as well as private key material are not changed.

As in present caching systems, there exists no mechanism to stop mischievous cachers from pointing to a cached item, such as a video clip, and there exists no mechanism for the content provider to be aware that the cached item has been accessed. Material requiring access control thus must be left uncached or be so encrypted that a private key, available only at the home site, is required for decryption.

As web content is often customized per customer on the go, the customization software will need to be aware of material previously cached. For this purpose, a library of cached items will be maintained for the user.

The content provider can upload the material to central complex 1 for broadcast by executing the upload function available at the central web site. The upload function will perform a simple FTP (File Transfer Protocol) of the files so designated by the content provider. These files will be stored at central complex 1 and a daemon associated with the uplink 5, alerted that files have been sent, will broadcast them to the ISPs via the satellite transponder 6.

The content provider will be given several choices for ISP distribution. A map will be provided of subscriber ISPs. Based on a page's community of interest, the content provider might elect to distribute the material in selected regions. A web page, for example, advertising Caribbean holidays might be distributed only to North American urban centres.

At the web site of the central complex 1, a daemon 15 will monitor which files are being uploaded. The upload feature is enabled only for subscribers. MFTP, for example, (Multicast FTP from Starburst Corp.) can be used as the protocol for ensuring accurate and synchronized delivery to all the member ISPs. If all ISPs are not updated the process backs out and an alert is sent to a network manager at the central complex 1. The manager determines the cause and tries again. The network manager also keeps track of which subscribers have received what material.

Software is provided at the ISP site 8 to enable the ISP to save or discard incoming material. This is done after reception. If the material is an updated version, deletion if it will also delete the original cached item.

The content provider's web site 12 is partitioned and cached. If a client 16 connected to ISP provider 8 wishes to access this site three routing scenarios are possible.

(1) requests for uncached material
(2) requests for cached material that is present at the ISP and
(3) requests for cached material that isn't present.

In normal operation a client 16 attached to ISP 8 wishing to access a content provider 12 types a URL on his or her web browser, such as http://www.cp.com. The router 17 receives the request from the client 16 and obtains the IP address from the Domain name server serving the ISP 8. Once the IP address has been obtained, a TCP connection is established from the client 16 to the content provider 12 over the Internet 9. When using the system in accordance with the invention the client 16 will normally request access to an uncacheable page and be granted access to it at the content provider's site 12 in the conventional manner.

If the client 16 requests a link to a cached page, recognizable by its unique monicker, the router recognizes the request and routes its to the local cache 11 to retrieve the appropriate material and pass it to the client 11. To effect the redirection of flows to the local cache instead of the content provider's site, changes only need to be made to the ISP's router's tables using a static route. In this implementation, mdc.net is assigned two IP addresses, one for all its local caches, another for its central cache. In static routing, all addressing that is prefixed by the local cache IP address is routed to the local cache server.

In the example shown in FIG. 3 mdc.net is assigned the address 166.24.56.254 and mdc2.net is assigned the address 166.24.64.254. 166.24.56.254 is assigned the static route—all packets are forwarded to Ethernet port ¼ in the ISP 8 and subsequently to the local cache server.

Figure 3:
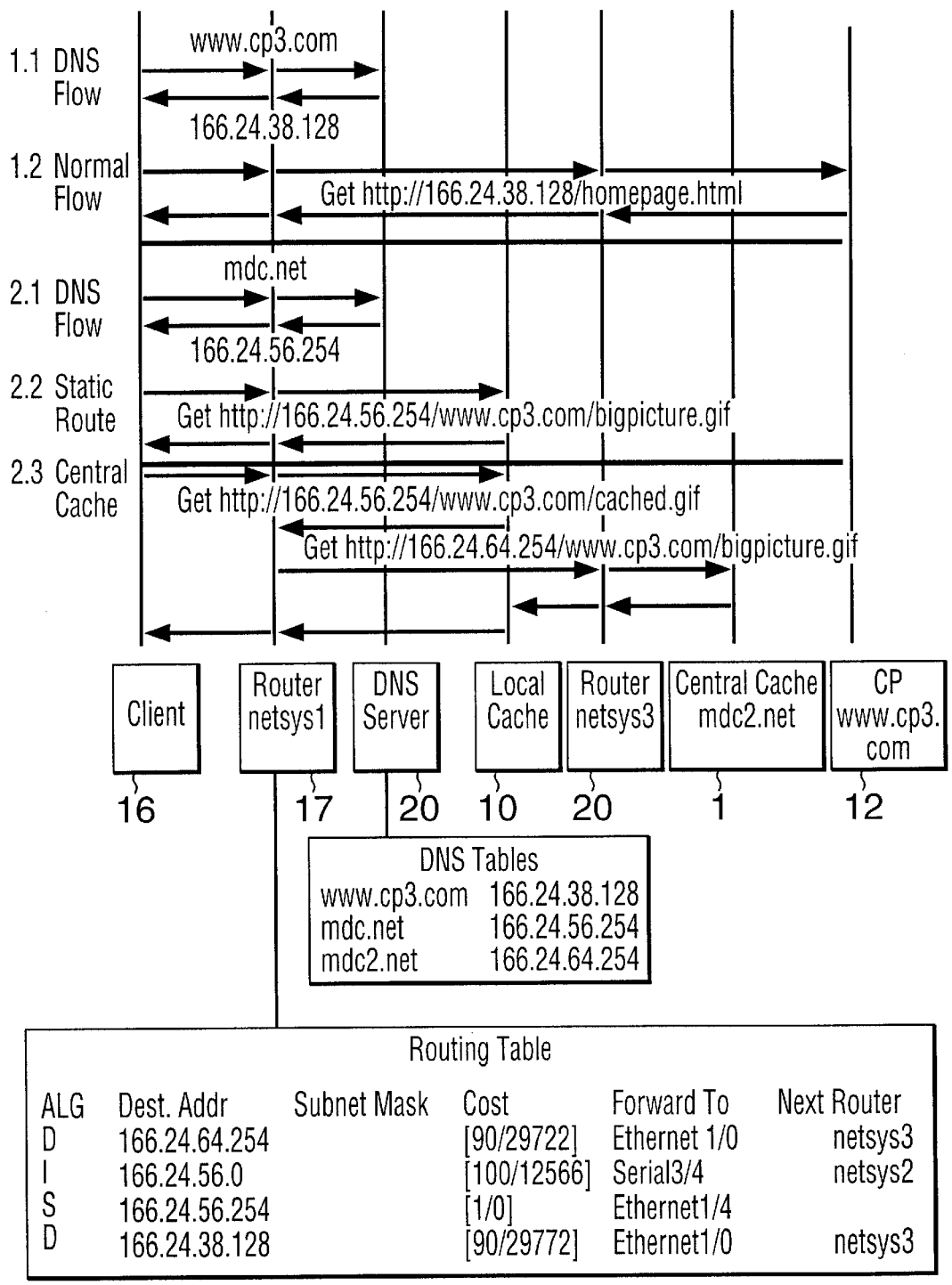
FIG. 3 is a data flow diagram.

The possible message flows and flow diagrams are depicted in FIGS. 1, 2 and 3.

Scenario 1

The client 16 requests a connection to http:\\www.cp3.com\homepage.html.

The client's browser via the DNS (Domain Name Server) 20 and, using UTP, resolves and returns the IP address of www.cp3.com. Once returned, a TCP connection is set up in the usual way through the Internet 9 and all IP packets are routed, by the ISP router 17, in a standard fashion to the client 16 from the content provider 12.

Scenario 2

By clicking on a link embedded in a previously delivered page, the client requests a connection to: http:\\mdc.net\www.cp3.com\bigpicture.gif.

The client's browser via the DNS 20 associated with the ISP 8 and, using UTP, resolves and returns the IP address of mdc.net, which corresponds to the IP address of the central caching complex 1. Normally the browser would then set up a TCP connection, via the ISP's router to central cache site. However, the router 17 first looks at its static routing table and sees that all references to the IP address corresponding to mdc.net are to be short circuited to the local cache. A TCP connection between the client 16 and the local cache 10 is then set-up and www.cp3.com\bigpicture.gif returned from the mass storage devices 11 if present.

Scenario 3

The client requests a connection to: http:\\mdc.net\www.cp3.com\bigpicture.gif.

The browser via DNS 17 and, using UTP, resolves and returns the IP address of mdc.net. Normally the browser would then set up a TCP connection, via the ISP's router 17 to the central cache site 1. In case the router 17 first looks at its static routing table and sees that all references to the IP address of mdc.net are to be short circuited to the local cache 10. A TCP connection between the client and the local cache is then set-up but the file www.cp3.com\bigpicture.gif is not found. The local cache then re-inititiates the request by substituting, for the mdc.net address, the IP address for mdc2.net. The request is passed first to the router 17 then on to mdc2.net, the location of central cache 1. In the case of a hierarchy of caches, this can, in turn, be routed statically at the other routers, such as 20, to caches further up the chain or alternatively to the content provider's site itself. This latter scenario, routing to the content provider, is an option available to content providers who do not wish to store their material at the central cache 1 and can be realized through message forwarding at the central cache 1.

The system in accordance with the invention thus provides a web hosting service, enabling efficient storage of content provider selected cacheable and non cacheable web content, and software for changing existing web content. It also provides a reliable cache update system including a broadcast channel and uploading facility, an Internet acknowledgement channel, software to ensure reliable delivery, a satellite receiver; and an ISP system, comprising storage servers, filtering software to select cacheable material, the use of static routes to redirect requests, and software to effect these changes in the ISP routing tables in order to redirect requests to the ISP cache or to the web host.

Other aspects of the invention include differential referencing of the web content, and proxy-less caching at the subnet router, both important elements of a seamless and simple inter-working of the system.

The system provides local caching (actually local server replication) without the requirement for an "in-line" proxy server to process every packet as it leaves the subnet (a known bottleneck on performance for all page fetches, not just the ones going to the cache). The cache sites are directly on each local subnet, so there is no need to route all traffic through a proxy. Indeed, references to data on the mirror server work exactly like local references so there is no impact on the routing performance of packets heading for non-replicated servers—an important improvement over existing models.

The system also provides a scheme for transparent, simple global addressing. On networks comprised of semi-autonomous subnets, address resolution (whether it be DNS, IP routing, or ARP) is attempted locally before it is passed up to the next network. There are several ways to spoof the address resolution protocol (NS or IP routing, or maybe even ARP) so that what is actually a global address, not on the subnet, appears to be assigned to a local server (our mirror server) that is on the subnet. Spoofing describes a situation in which one machine claims to be another in order to intercept packets. By restricting the IP address of the mirror server to a single legal globally resolvable IP address (e.g., 'fast.net' (or a contiguous subset like a class C address), spoofing easier to achieve, another important improvement. Secondly, for subnets without a mirror server, the fact that a globally resolvable address (DNS or IP) is used means that clients will still be able to resolve the address to an actual server. This scheme provides an elegant solution to the "not replicated locally" problem by allowing non-participating subnets to remain unchanged—a very important improvement over existing schemes.

We claim:

1. A system for disseminating information over a wide area network, comprising:
   a) at least one site for disseminating data to remote users on said network, said at least one site having a network address associated therewith and being accessible over said wide area network, and said data including cacheable and non-cacheable parts;
   b) a central caching unit having a network address associated therewith for storing cacheable data from said at least one site;
   c) means for establishing communication between said at least one site and said central caching unit for transferring cacheable data to said central caching unit;
   d) a plurality of local access nodes for permitting said remote users to access said wide area network;
   e) distributed local caching units associated with said local access nodes for locally storing cacheable data;
   f) a communications system distinct from said wide area network for establishing communication between said central caching unit and said local caching units for the transfer of cacheable data directly from said central caching unit to said local caching units; and
   g) routing means at said local access nodes for responding to user requests for data by establishing a connection to a destination address on said network where the requested data is located, said routing means including local routing tables containing the network address of said central caching unit and responding to connection requests from said remote users to retrieve data located at said central caching unit by first establishing a connection with the local caching unit at the associated local node to retrieve the requested data therefrom if present, and if the requested data is not present at said local caching unit, establishing a connection over said network with said central caching unit to retrieve said requested data over the wide area network.

2. A system as claimed in claim 1, wherein said communications system is a multicast communications system.

3. A system as claimed in claim 1, wherein said communications system is a satellite communications system.

4. A system as claimed in claim 1, wherein the data stored at said central caching unit has a distinctive identifier, and said local routing tables respond to a request for data with a said distinctive identifier by associating it with the network address of the locally cached material.

5. A system as claimed in claim 4, wherein said distinctive identifier is associated with the network address of said central caching unit, and in the event that requested data is not available in the local caching unit, said local caching unit is programmed to set up a connection via said router with said central caching unit over the wide area network.

6. A system as claimed in claim 5, wherein said distributed local caching units comprise servers and storage devices on a local subnet attached to said routing means.

7. A system as claimed in claim 1, wherein said local routing tables are static routing tables.

8. A system as claimed in claim 2, wherein said non-cacheable data resides on a storage device at said at least one site for access by a remote user over said wide area network.

9. A system as claimed in claim 1, wherein said means for establishing communication between said at least one site and said central caching unit comprises means for establishing a connection over said wide area network.

10. A system as claimed in claim 9 further comprising filtering means at said distributed local caching units to permit multicast material to be filtered in accordance with local requirements.

11. A system as claimed in claim 2, wherein said wide area network is the Internet.

12. A method of disseminating information over a wide area network, comprising the steps of:
    a) providing at least one site for disseminating data to remote users on said network, said at least one site having a network address associated therewith and being accessible over said wide area network, and said data including cacheable and non-cacheable parts;
    b) storing cacheable data from said at least one site at a central caching unit having a network address associated therewith;
    c) transferring said cacheable material over a communications system distinct from said wide area network directly to distributed local caching units associated with local access nodes giving remote users access to said wide area network for the retrieval of data from sites thereon; and
    d) intercepting requests from users at said local access nodes for data residing on said central caching unit and first routing said requests to the local caching unit for retrieval of the requested data therefrom if present, and if the requested data is not present at said local caching unit, subsequently routing said requests to the central caching unit for retrieval of the requested data from the central caching unit.

13. A method as claimed in claim 12, wherein the central caching unit has a unique identifier to permit requests for the retrieval of data from the central caching node to be intercepted at the local access nodes and forwarded to the local caching units.

14. A method as claimed in claim 15, wherein the local routing tables in a router associated with each local access node associate the network address of the central caching unit with the local caching unit so as to forward requests for data from the central caching unit to the local caching unit.

15. A method as claimed in claim 14, wherein said local routing tables are static routing tables.

16. A method as claimed in claim 13, wherein said cacheable data is multicast via a satellite communications system establishing satellite communications between said central caching unit and said local caching units.

17. A method as claimed in claim 16, wherein cacheable data is uploaded to said central caching unit from said at least one site via said wide area network.

18. A method as claimed in claim 17, wherein non-cacheable data is retrieved from said at least one site over the wide area network upon the request of a user.

19. A method as claimed in claim 13, wherein data received at said local caching units is filtered in accordance with local requirements.

20. A method as claimed in claim 15, wherein said wide area network is the Internet and said distinctive identifier is a URL with a distinctive moniker embedded in the URL.

21. A method as claimed in claim 20, wherein said distinctive monicker is the domain name of said central caching unit.

22. A method as claimed in claim 13, wherein the cacheable and non-cacheable data is designated by the operator of said at least one site.

* * * * *